April 25, 1933.  G. INNES  1,905,409

METHOD OF HARVESTING GRAIN

Filed Feb. 20, 1929   3 Sheets-Sheet 1

INVENTOR.
George Innes
BY Evans & McCoy
ATTORNEYS.

April 25, 1933. G. INNES 1,905,409
METHOD OF HARVESTING GRAIN
Filed Feb. 20, 1929 3 Sheets-Sheet 2
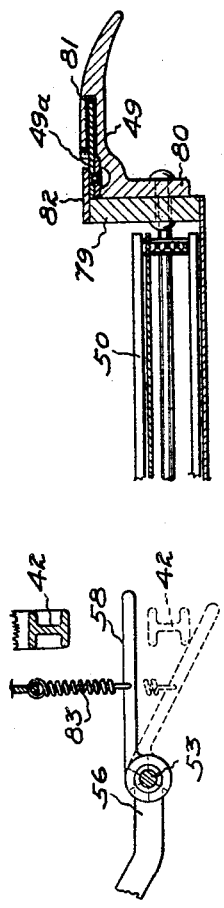
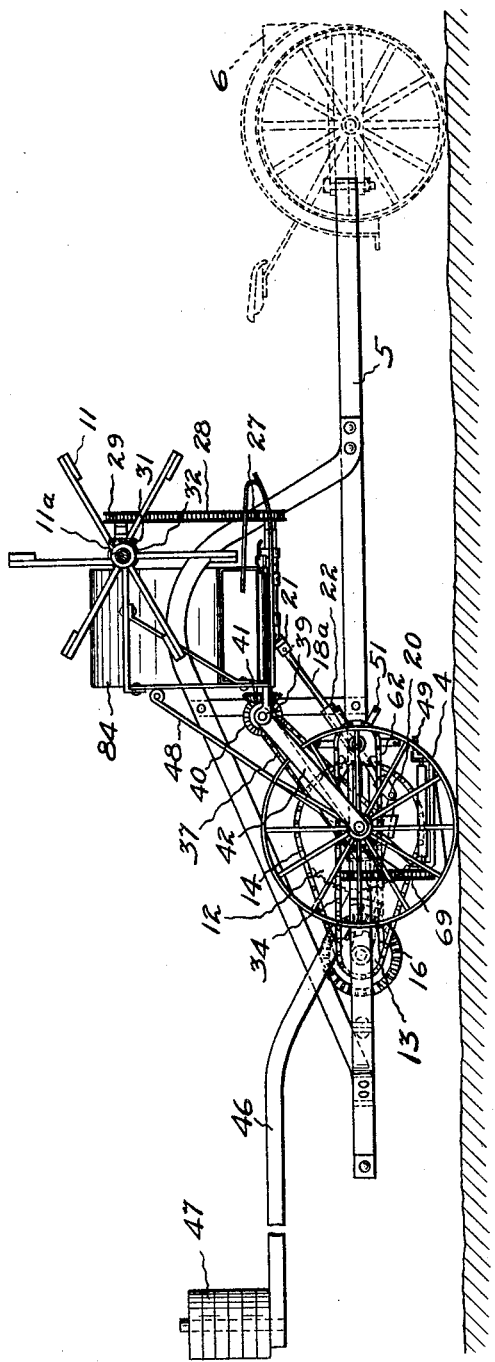
INVENTOR.
George Innes
BY Evans & McCoy
ATTORNEYS.

Patented Apr. 25, 1933

1,905,409

UNITED STATES PATENT OFFICE

GEORGE INNES, OF DAVENPORT, IOWA, ASSIGNOR TO INNES MANUFACTURING COMPANY, OF BETTENDORF, IOWA, A CORPORATION OF DELAWARE

METHOD OF HARVESTING GRAIN

Application filed February 20, 1929. Serial No. 341,293.

This invention relates to a method of and apparatus for harvesting grain and more particularly to a method of and apparatus for cutting off the heads of the grain and delivering the same in windrows for curing prior to the threshing operation.

The method of harvesting with a combined harvester and thresher in which the heads of grain are delivered directly from a header to a threshing machine travelling therewith is far from satisfactory for the reason that in most cases a considerable proportion of the heads of grain will not be properly cured and the threshed grain is consequently of inferior quality. Furthermore, when the kernels of grain are not properly cured, it is difficult to avoid spoilage of the grain by heating and moulding when stored in bulk.

It has been proposed to deposit the heads from the heading machine in windrows across the field and after the grain has had time to cure, to thresh the grain in a threshing machine which travels along the windrows gathering and threshing the heads of grain. This method, however, except in fields in which the straw is short offers serious difficulties.

If the stalks of straw are cut near the heads or at half their length, the stubble is then so flexible that it collapses allowing the windrow to come close to the ground, whereas the stubble should remain erect, and thus provide a ventilating space beneath.

If, in order to provide a stiff stubble, the stalks of straw are cut close to the ground, then the volume of heads and straw make so thick a windrow as to prevent proper curing, also this excessive bulk prevents proper threshing as the threshing unit of the combined harvester-thresher is designed for heads only. Also, the greater weight of the bulk of heads and straw causes even the short stubble to be pressed down and thus prevent ventilation from beneath and the moisture from the earth passes up into the windrow and causes the windrow to become more damp than when made. This causes the grain to deteriorate and sometimes mold.

The present invention has for its object to provide a method of harvesting by which the grain may be effectively cured in windrows regardless of the height of the standing grain in the field being harvested.

A further object is to provide a method by which the windrows of grain heads are supported clear of the ground so that air may circulate freely through and beneath the windrow to cure the grain and so that the grain may be easily picked up and delivered to the threshing machine.

A further object is to so position the windrows that the harvesting machine and the tractor or draft animals pulling the machine may make the turns at the corners of the field without disturbing previously formed windrows.

A further object is to provide a machine which has a main cutter unit which cuts off the heads of grain and delivers them laterally from the machine into a windrow and a secondary cutter which cuts a swath in the standing straw left by the main cutter and clears a pathway of stubble to receive a windrow of grain heads from the machine.

A further object is to provide a machine in which both the main and auxiliary cutter units are vertically adjustable to cut off the heads and the standing straw at the proper heights from the ground to obtain heads of the desired length and stubble of the proper length to receive and support the windows of heads.

With the above and other objects in view, the invention may be said to comprise the method and machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 2 is a side elevation of the machine.

Fig. 3 is a section taken on the line indicated at 3—3 in Fig. 1.

Fig. 4 is a section taken on the line indicated at 4—4 in Fig. 1.

Figure 1:
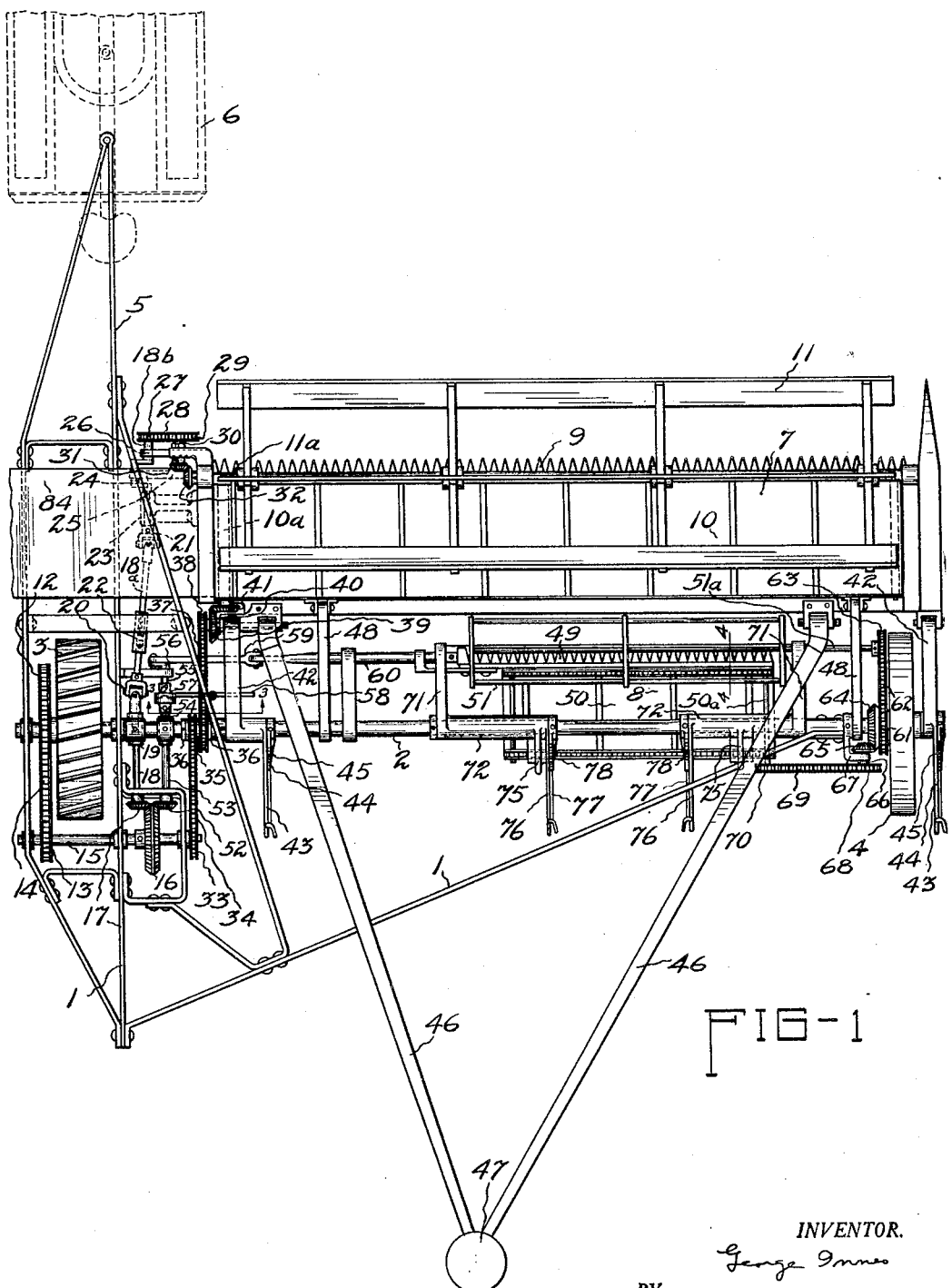
Figure 1 is a plan view of a machine designed to perform the method of the present invention.

Referring to the accompanying drawings, the machine of the present invention is provided with a rigid frame which is designated generally by the reference numeral 1 which is supported on an elongated axle 2 rigidly and nonrotatably secured to the frame 1.

Rotatably mounted on one end of the axle, there is a bull wheel 3 and rotatably mounted on the axle at the opposite end, there is a grain wheel 4. The frame 1 has a forwardly projecting portion 5 at the end thereof supported by the bull wheel and this projection forms a tongue for attachment to a tractor 6 by which the machine may be drawn.

The machine is provided with a main cutter unit 7 which extends nearly the full width of the machine and serves to cut off the heads of the grain and deliver the same laterally to one side of the machine. The machine also has an auxiliary cutting unit 8 which is positioned rearwardly of the main cutter unit 7, which is shorter than the cutter unit 7 and which serves to cut a swath in the standing straw left by the main cutter unit 7. The secondary cutter unit 8 is so positioned with respect to the main cutter unit 7 that it provides a pathway of relatively short stubble so disposed with respect to the swath cut by the main cutter or heading unit 7 that upon the next passage of the machine across the field, it will receive the windrow of grain heads cut and delivered by the main cutting unit.

The main cutting unit 7 comprises the serrated fixed cutter bar 9, in which the reciprocating sickle is slidably mounted, together with an endless belt conveyor 10 which projects past the cutter bar at one end to deliver the heads at one side of the machine. The cutting element is also provided with a reel 11 carried by a shaft 11a directly over the cutter bar so that the blades of the reel will sweep the heads as they are severed by the cutter onto the conveyor belt.

The sickle 9a is driven from the bull wheel 3 by mechanism which will now be described: A sprocket wheel 12 is attached to the outer side of the bull wheel and drives a second sprocket 13 through a sprocket chain 14. The sprocket 13 is fixed to a shaft 15 mounted in the frame 1 rearwardly of the bull wheel 3 and this shaft has fixed thereto inwardly of the bull wheel a double bevel gear 16, one face of which meshes with a small bevel gear 17 carried by the forward section of a sectional and extensible shaft 18. The rear section of the shaft 18 to which the bevel gear 17 is attached is journaled in a bearing 19 suspended from the axle 2 and is connected by a universal coupling 20 with an extensible intermediate section 18a which is connected by a second universal coupling 21 with the forward section 18b of the shaft which is journaled in the frame of the cutter unit. The intermediate section 18 composed of two sections is joined by a coupling sleeve 22 with which one of the sections is telescopically engaged. The universal couplings 20 and 21 and the coupling sleeves 22 permit the cutter unit to be adjusted vertically without disturbing the driving connections through the shaft 18. The forward section 18b of the shaft is journaled in a bearing bracket 23 mounted on the cutter frame and is provided with a crank portion 24 which is connected by a pitman 25 to the reciprocating cutter.

Forwardly of the crank portion, the shaft 18b is journaled in a bearing 26 and has fixed thereto a sprocket 27 which drives the sprocket chain 28, which runs over the sprocket 27 and over a sprocket 29 fixed to a short shaft 30 which has fixed thereto a bevel gear 31 meshing with a bevel gear 32 fixed to the reel shaft 11a, so that the reel 11 is continuously rotated by the above described gearing from the shaft 18 simultaneously with the reciprocation of the sickle.

The conveyor 10 is also driven from the shaft 15 through a sprocket 33 fixed to the inner end of the shaft 15 which drives a sprocket chain 34 which extends over the sprocket 33 and a double sprocket 35 rotatably mounted on the axle 2, and held against longitudinal movement on the axle by means of collars 36 fixed to the axle on opposite sides thereof. A sprocket chain 37 extends from the double sprocket 35 to a sprocket 38 fixed to a shaft 39 journaled in the conveyor frame and the shaft 39 carries a bevel gear 40 which meshes with the bevel gear 41 carried by the drive shaft 10a of the conveyor.

The main cutter unit is adjustably supported by arms 42 pivoted at their rear ends to the axle, extending forwardly and upwardly from the axle and pivoted at their forward ends to the frame of the cutter unit. The pivots connecting the forward ends of the arms 42 to the frame of the conveyor unit are axially alined and each of the arms 42 is provided with an integral lever 43 extending rearwardly from the axle, each lever 43 carrying a manually operable detent 44 which is engageable with a rigid segment 45 fixed to the axle. By releasing the detents 45, the operator may adjust the cutting unit up and down by means of the levers 43 and in order to assist in the adjustment of the cutter unit, rearwardly converging arms 46 are pivoted to the frame of the cutting unit and extend rearwardly over the axle and have a counterweight 47 attached to the rear ends thereof.

The arms 46 fulcrum on the axle and the counterweight 47 counterbalances the cutter unit so that it may be easily moved up or down by means of the levers 43. In order to maintain the cutter unit 7 in operative position, bracing links 48 are connected at their lower ends to the axle and at their upper ends to the frame of the cutting unit at points considerably above the connection of the arms 42 thereto so that the conveyor 10 is maintained in approximately a horizontal position in all positions of vertical adjustment.

A secondary cutting unit is provided with a stationary cutter bar 49 and a reciprocating sickle 49a substantially identical with the sickle of the main unit and is provided with a conveyor belt 50 which is somewhat shorter than the cutter bar and which serves to deliver the straw at one side of the swath cut by the sickle.

The secondary cutter may also be provided with a reel 51 mounted on a shaft 51a and operating in the same manner as the reel 11 of the main cutter bar to sweep the severed stalks of straw onto the conveyor belt 50. In view of the construction of the auxiliary or secondary cutter, the reel for this may be omitted if desired. The reciprocating sickle 49a of the secondary cutting unit is driven from the double bevel gear 16, the inner face of which meshes with a small bevel gear 52 on a shaft 53 journaled in the frame 1 and in a bearing 54 suspended from the axle 2. The shaft 53 drives a shaft 55 which has a crank arm 56, the shaft 55 being driven from the shaft 53 through a clutch 57 which is controlled by a shifter lever 58. The crank arm 56 is connected by a pitman 59 with an extension 60 of the movable sickle 49a.

The reel 51 of the secondary unit is driven from the grain wheel 4 through a sprocket 61 carried by the grain wheel 4 and a sprocket chain 62 running over the sprocket 61 and over a sprocket 63 attached to the shaft 51a of the reel.

The conveyor of the secondary unit is also driven from the grain wheel 4 through a bevel gear 64 attached to the wheel. A bevel gear 65 meshes with the gear 64 mounted on a short shaft 66 journaled in a bearing bracket 67 fixed to the axle and having attached thereto a sprocket 68 which drives a sprocket chain 69 running over a sprocket 70 fixed to the drive shaft 50a of the conveyor 50.

The secondary cutting unit is also adjustably mounted and is supported from the axle by means of arms 71 which extend forwardly from sleeves 72 rotatably mounted on the axle. The arms 71 are pivoted at their forward ends to the ends of the reel shaft 51a and the rear side of the unit is supported by arms 75 extending downwardly from the sleeves 72 and pivoted to the rear edge of the conveyor frame. The sleeves 72 may be adjusted on the axle 2 to raise and lower the secondary cutting unit by means of rearwardly extending lever arms 76 integral with or fixed to the sleeves and the sleeves are held in adjusted positions by means of manually operable detents 77 which are carried by the lever arms and engage with ratchet segments 78 fixed to the axle 2.

Where the stand of grain is quite low, the main cutting unit 7 may be adjusted to approximately the same level as the auxiliary cutter and means is provided for automatically discontinuing the operation of the auxiliary cutter when the main cutter is lowered to a position near that of the auxiliary cutter. As shown in Fig. 3 of the drawings, the clutch shifter lever 58 projects beneath the supporting arm 42 at the end of the cutting unit adjacent the bull wheel and when this arm is lowered into engagement with the lever 58, the lever is moved downwardly in opposition to the spring 83 to disengage the clutch 57 and release the shaft 55 from the shaft 53. Whenever the arms 52 are adjusted upwardly to raise the main cutting unit, the clutch lever 58 is released and the clutch is returned to engaging position by the spring 83.

Fig. 4 of the drawings shows the mounting of the secondary cutter bar on the forward side of the conveyor frame. As shown in Fig. 4, the cutter bar 79 is a flat bar having its width disposed vertically and forming the front side member of the conveyor frame projecting slightly above the top of the conveyor belt and to which are secured guard teeth 49 which guard teeth differ from the usual guard teeth in that they have a downward projection 80 which is fastened to the vertically disposed bar 79. The guard teeth 49 have slots 81 within which the sickle 49a slides, which is retained in alinement with the slot by means of a plate 82 attached to the upper edge of the frame member 79.

There are two purposes in placing the cutter bar 79 in a vertical position. One is to give strength and rigidity without excessive weight. The other is that by having a narrow ledge back of the sickle, the lower end of the cut straw falls immediately into the path of the bars of the conveyor and are thus removed from the cutting operation, thereby preventing clogging of the sickle and permitting the reel to be omitted, if desired.

The frame member 79 forms a rigid support for the cutter bar which is, by reason of its angle shape, in itself quite rigid so that accurate alinement of the slots 81 and the teeth of the bar is maintained and bending of the sickle during operation is prevented.

Figure 5:
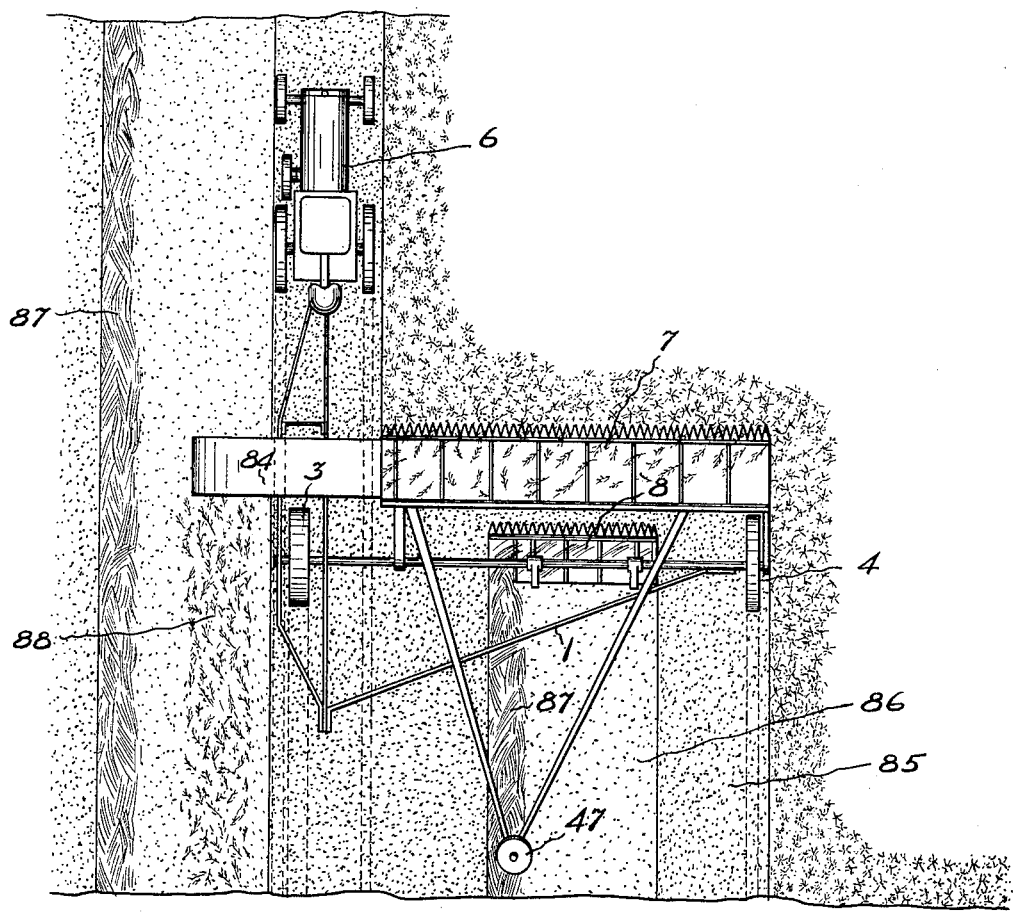
Fig. 5 is a plan view of the machine showing the cuts made by the machine in a field of standing grain.
Figure 6:
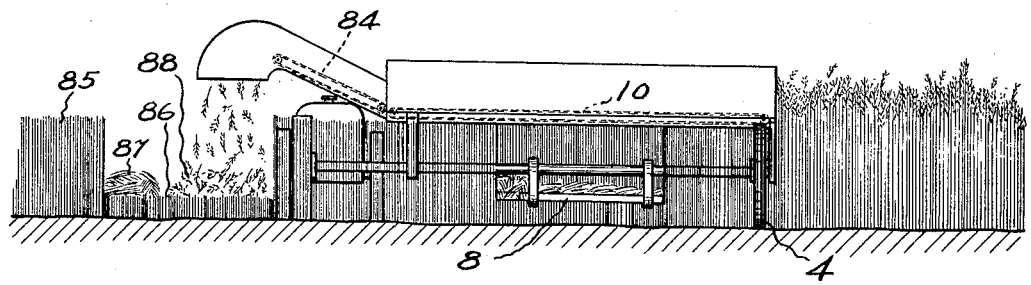
Fig. 6 is an end elevation in the machine showing the cuts made thereby in a field of standing grain.

In the operation of the machine, it is drawn across the field by the tractor 6, cutting a swath as shown at 85 in Figs. 5 and 6 a short distance below the heads of the grain, leaving the major portion of the stalks standing. At the same time, the secondary cutter 8 cuts a swath 86 through the standing straw behind the primary cutter of considerably less width than the swath cut by the main cutter and may be positioned anywhere within the swath cut by the main cutter. The straw cut by the auxiliary unit 8 is delivered in a windrow 87 along one side of the swath 86, leaving the major portion of the swath clear of straw so that there is a pathway of standing stubble ready to receive heads of grain delivered from the discharge portion 84 of the conveyor 10 upon the next passage of the machine across the field. After the first cut across the field, the tractor 6 travels in the standing straw to the inner side of the swath 86 and the discharge portion 84 of the conveyor delivers onto the pathway of stubble depositing the windrow 88 of heads alongside the windrows 87 of straw. The windrow 88 of heads is entirely clear of the machine so that the tractor and the harvest machine may be turned at the corners of the field without disturbing the windrow of heads. The short stubble upon which the heads are delivered supports the windrow 88 of heads entirely clear of the ground so that there is free circulation of air beneath the windrow so that the heads will be rapidly cured and the windrow of heads loosely supported on the top of the stubble can be easily gathered by the pickup mechanism of the thresher so that there will be very little loss of grain.

It will be apparent that the present invention provides a simple method of harvesting which enables the grain to be uniformly and thoroughly cured before it is threshed and which enables the heads of grain to be gathered with a minimum loss of grain in the standing stubble.

Furthermore, it will be apparent the cutting and windrowing of the heads is accomplished by means of a machine which is of simple and relatively inexpensive construction.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The herein described method of harvesting grain which consists in severing the heads of grain from the stalks and collecting said heads, cutting swaths through the standing straw to provide pathways of standing stubble, and depositing the severed heads in windrows on the standing stubble along said pathways.

2. The herein described method of harvesting grain which consists in severing the heads of grain from the stalks and collecting said heads, cutting swaths through the standing straw, and depositing the straw and heads in parallel windrows, the latter on the standing stubble left by the second cutting operation.

3. The herein described method of harvesting grain which consists in cutting the standing grain a short distance below the heads and in swaths extending across the field, cutting the standing straw in swaths disposed within the first mentioned swaths, moving the cut straw laterally to leave a cleared pathway of standing stubble, collecting the heads of grain and depositing the same in windrows on the standing stubble along said cleared pathways.

4. The herein described method of harvesting grain which consists in cutting the standing grain a short distance below the heads and in swaths extending across the field, cutting the standing straw in narrower swaths centrally disposed with respect to the first mentioned swaths, and depositing the heads and the straw in parallel windrows, the former on the standing stubble left by the second cutting operation.

5. The herein described method of harvesting grain which consists in cutting swaths through the standing grain, thereby removing the heads, severing the headless stalks closer to the ground along a given section of said swaths, depositing the severed portions of the stalks in windrows at one side of the stubble formed by the severing act, and depositing the heads on that part of the stubble from which the stalks have been removed.

In testimony whereof I affix my signature.

GEORGE INNES.